(12) United States Patent
Campbell et al.

(10) Patent No.: US 11,135,738 B2
(45) Date of Patent: Oct. 5, 2021

(54) SPENT COFFEE GROUNDS AS A LUBRICANT IN A METHOD OF PELLETING OF WOOD

(71) Applicants: Gregory Campbell, Coatesville, PA (US); Connor Gingrich, Coatesville, PA (US)

(72) Inventors: Gregory Campbell, Coatesville, PA (US); Connor Gingrich, Coatesville, PA (US)

( * ) Notice: Subject to any disclaimer, the term of this patent is extended or adjusted under 35 U.S.C. 154(b) by 0 days.

(21) Appl. No.: 16/383,070

(22) Filed: Apr. 12, 2019

(65) Prior Publication Data

US 2020/0262100 A1 Aug. 20, 2020

Related U.S. Application Data

(63) Continuation-in-part of application No. 16/382,105, filed on Apr. 11, 2019, now abandoned.

(60) Provisional application No. 62/806,861, filed on Feb. 17, 2019.

(51) Int. Cl.
*B27N 5/00* (2006.01)
*C10L 5/44* (2006.01)
*C10L 5/36* (2006.01)

(52) U.S. Cl.
CPC ............... *B27N 5/00* (2013.01); *C10L 5/363* (2013.01); *C10L 5/445* (2013.01)

(58) Field of Classification Search
CPC combination set(s) only.
See application file for complete search history.

(56) References Cited

U.S. PATENT DOCUMENTS

| 4,380,424 A * | 4/1983 | Skoch ................... B30B 11/202 425/331 |
| 4,612,017 A * | 9/1986 | Lindell ..................... C10L 5/14 44/576 |
| 6,793,697 B2 * | 9/2004 | Sprules ................... C10L 5/365 44/535 |
| 2007/0089805 A1 * | 4/2007 | Swaan .................. F26B 17/102 144/1.1 |

(Continued)

FOREIGN PATENT DOCUMENTS

WO    WO-2013030311 A1 *  3/2013  .............. C10L 5/143

OTHER PUBLICATIONS

The Possibility of Disposing of Spent Coffee Ground With Energy Recycling Gomasz Ciesielczuk, Urszula Karwaczynska Monika Sporek Journal of Ecological Engineering vol. 16 Issue 4 Oct. 2015 pp. 133-138 (Year: 2015).*

(Continued)

*Primary Examiner* — Ellen M McAvoy
*Assistant Examiner* — Chantel L Graham
(74) *Attorney, Agent, or Firm* — The Bilicki Law Firm, PC

(57) ABSTRACT

Pellets and a process for producing pellets are disclosed. The process includes recovering spent coffee grounds from a coffee production facility. The coffee grounds are then subject to a drying process to remove moisture from the coffee grounds to form dried coffee grounds. A mixture of about 0.5-10% dried coffee grounds and wood material is then formed. The mixture is then compressed in a pellet mill to form wood pellets including about 0.5-10% coffee grounds. The coffee grounds in the wood material acts as a lubricant for the pelleting machinery and eliminate the need for other lubricants in the process.

13 Claims, 2 Drawing Sheets

(56) References Cited

U.S. PATENT DOCUMENTS

| | | | | |
|---|---|---|---|---|
| 2008/0010898 A1* | 1/2008 | Chandaria | ............... | C10L 5/361 |
| | | | | 44/435 |
| 2010/0300368 A1* | 12/2010 | Myers | .................. | A01K 1/0154 |
| | | | | 119/171 |
| 2011/0287159 A1* | 11/2011 | Hassan | ................... | C11B 13/00 |
| | | | | 426/602 |
| 2013/0212936 A1* | 8/2013 | White | ..................... | C10L 5/146 |
| | | | | 44/576 |
| 2014/0157660 A1* | 6/2014 | Carrera Varela | ........ | C10L 5/363 |
| | | | | 44/589 |

OTHER PUBLICATIONS

Coffee to Biofuels Chelsea Giller, Bhavish Malkani Josh Parasar Senior Design Reports CBE Dept, of Chemical and Biomolecular Engineering (Apr. 18, 2017) (Year: 2017).*

\* cited by examiner

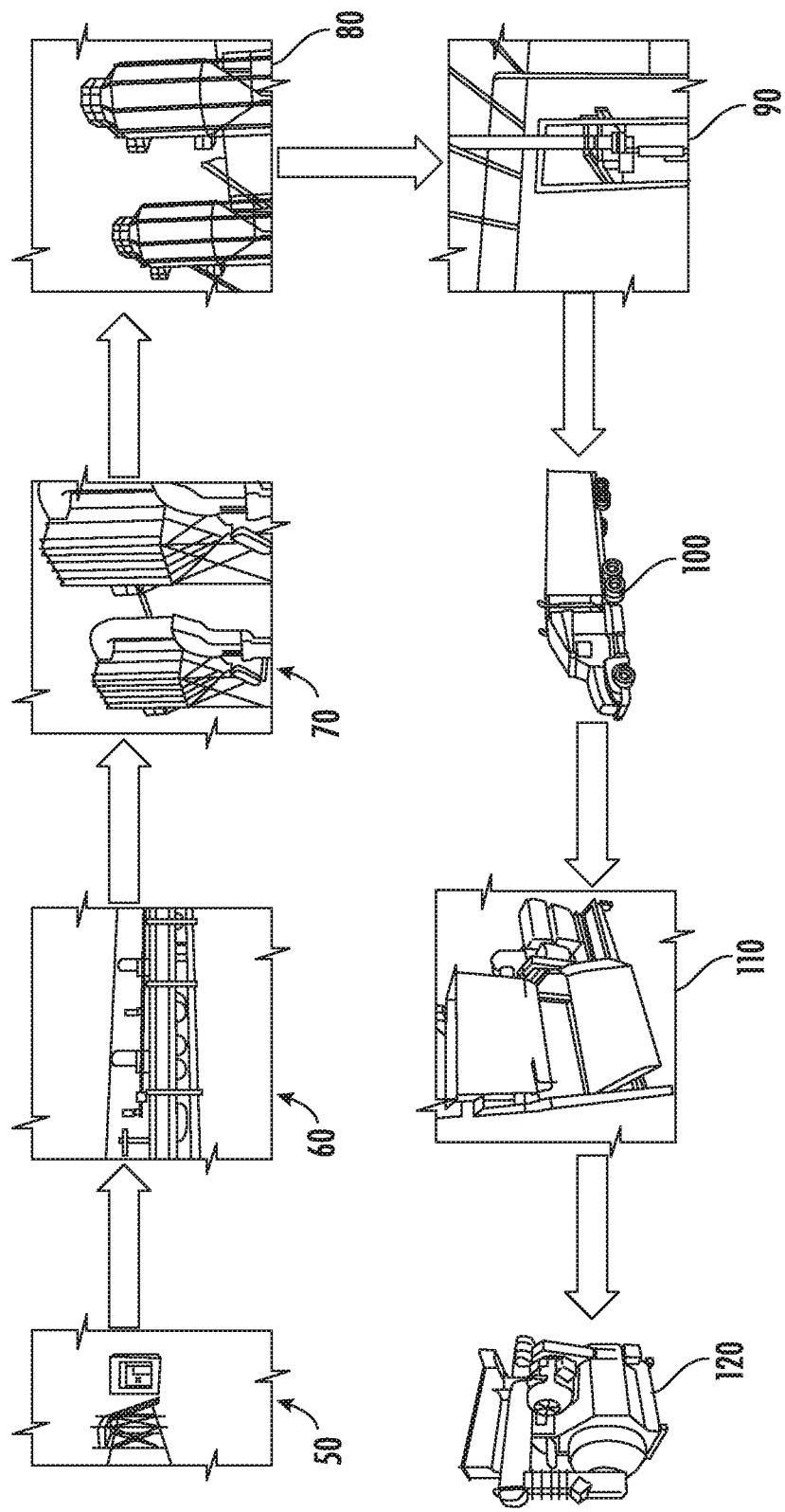

SPENT COFFEE GROUNDS AS A LUBRICANT IN A METHOD OF PELLETING OF WOOD

FIELD OF THE INVENTION

The present disclosure relates to a process for producing wood pellet, and, in particular, to a process for using a minor amount of dried spent coffee grounds as a lubricant in the pelleting process.

SUMMARY

A process is disclosed for producing pellets in pelleting machinery. The process includes recovering spent coffee grounds having a moisture content of about 50% directly from a coffee production facility. The coffee grounds are then subject to a drying process to remove moisture from the coffee grounds to form dried coffee grounds having a moisture content of 10% or less. A mixture of about 0.5-10% dried coffee grounds and 90-99.5% wood material is then formed. The mixture of wood material and the dried coffee grounds has a moisture content of about 8% to 14%. The mixture is then compressed in a pellet mill to form wood pellets including about 0.5-10% coffee grounds. The coffee grounds in the wood material acts as a lubricant for the pelleting machinery and eliminate the need for other lubricants in the pelleting process.

DESCRIPTION OF THE DRAWINGS

FIG. 2 is a flow chart illustrating the process of the present disclosure.

DETAILED DESCRIPTION

Figure 1:
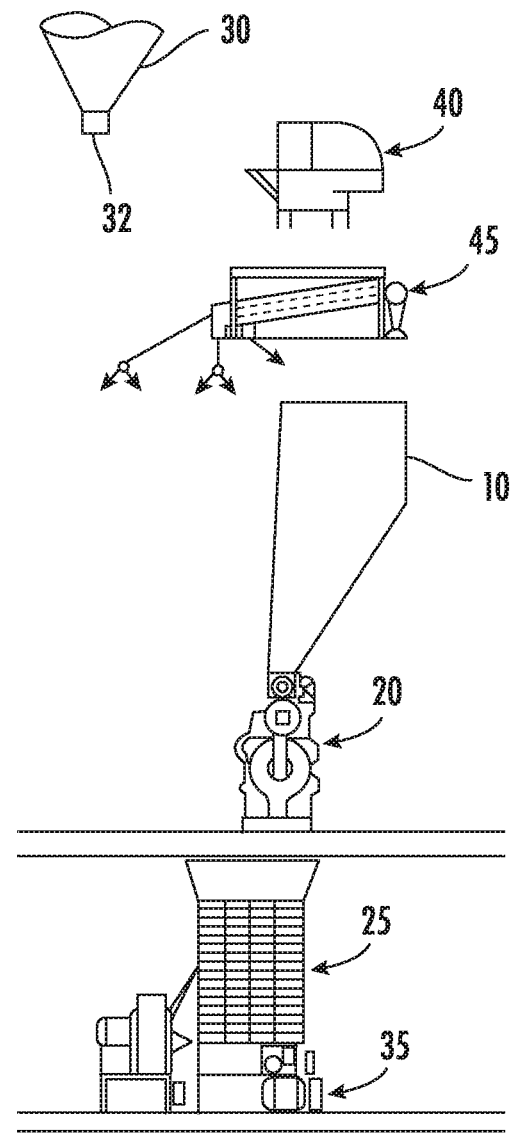
FIG. 1 illustrates a pelleting system.

In general, wood pellets are a renewable energy carrier which is produced from sawdust or other ground woody materials. International standards define product requirements i.e. moisture, energy density, abrasion resistance, particle size and shape for wood pellets (ISO 17225-2) which allowed wood pellets to turn into a commodity.

There are different pellets from different sources and qualities available today, such as wood pellets, animal feed pellets, torrefied pellets etc. Wood pellets of dedicated qualities are dominating and are delivered and consumed in two different markets: (1) In the electricity generation sector, they are co-fired in coal-based power plants and mono-fired in converted coal power plants to reduce greenhouse gas emission of electricity generation. (2) In the residential heating sector, they are widely used as a convenient solid biofuel application in automatic stoves and boilers. Therefor pellets with a dedicated quality are dominant, which are produced closer to the consumer and characterized by trade within the country or between neighboring countries. Delivery is realized in small scale units in the retail market and in large scale or bulk units in the power generation market.

Additional applications for the use of wood pellets are the use as fuel for mid-sized heat supply systems, such as district heating and CHP plants. Generally, pellets may be used for commercial/residential use or for industrial use. The majority of non-industrial, mostly heat market pellets traded are A1 quality, which are rated for residential heat supply.

As is known in the art, pelleting takes a finely divided, sometimes dusty, unpalatable, and generally difficult-to-handle feed material and, by use of heat, moisture, and pressure, forms the material into larger particles (pellets). These larger particles are easier to handle, more palatable and usually result in improved results when compared to the un-pelleted feed or fuel Pellets may be formed with diameters from $10/64"$ to $48/64"$ and will be somewhat longer than their diameter. In some embodiments, pellets may be cylindrical, triangular, square or oval.

Typically, a pelleting system is composed of several different machines designed to most efficiently accomplish the pelleting task. A typical system arrangement with equipment names is shown in FIG. 1. Initially, the pelleting process starts with a bin 10 in which the mixture to be pelletized is stored. The mixture then flows by gravity into the pellet mill 20 where pellets are formed. Hot extruded pellets are subsequently transferred by gravity into a cooler 25 where they are held while being cooled and dried by a flow of air. The air is drawn through the mass of pellets and passed into a dust collecting device, such as a cyclone collector 30. The dust from the outlet of the collector 32 is returned to the pellet mill 20 to again be compacted into a pellet. From the cooler 25, the product flows through or around a pair of crumble rolls 35. From the crumble rolls 35 the product flows into a bucket elevator 40 to be raised to a higher point in the structure where the shaker 45 is located. The shaker 45 separates the product into various sizes by passing the material over several screens. Each screen is of a different mesh size. This separation permits the desired product to be separated from the larger or smaller particles while being delivered to the finished product bin. The fines can be returned to the pellet mill for re-pelleting or, in the case of crumbles, to the cooler, where they are returned to the crumble rolls for re-crumbling. The fines or smaller material can be routed directly back to the pellet premix bin and reprocessed through the pelleting system.

In a typical pelleting operation, the mixture flows by gravity into the pellet mill die chamber where rollers press the softened mash through the holes in a circular die. Stationary knives located outside the circular rotating die, cut off the shaped dense pellet at the proper length. Most modern pellet mills used a ring type die that turns about two fixed rollers, with the die and rollers mounted in a vertical plane. A few mills are built with the dies and rollers in a horizontal plane with the rollers turning within the stationary die. In the pelleting unit, the conditioned mash is forced through holes in the die by roller pressure. Die thickness is a factor in the production of high quality pellets and must be accurately balanced with the formulation and conditioning. Starting with $24/64$ inch pellets and above, some variation in the amount and depth of taper incorporated into the entry of the holes in the die may be necessary. Numerous other special entries are used in instances where satisfactory pellets cannot be produced with standard entry and taper.

Pellet mills generally incorporate some type of speed reduction device, since die speeds are less than the conventional motor speeds. In some cases, variation in die speed is desirable to produce optimum results with respect to individual groups of feeds. Speed reduction devices in use today include direct coupled gear trains, V-belts, cog belts, as well as combinations of belts and gear trains. Currently, mills are being built with speed change mechanisms. Usually these speed change mechanisms are in the form of gear shifts or two-speed motors. Such mills provide two die speeds to secure optimum results when a wide range of feeds is produced.

Most pellet mills are installed with an electric motor as the prime mover; however, internal combustion engines are sometimes used. When internal combustion engines are used, the horsepower rating should be at least twice that of the electric motor normally used. The pellet mill and motor are usually mounted on a common base to maintain alignment of the pellet mill and motor and to provide a rapid, simple and efficient method of installing the equipment. Although it is not a standard part of the pellet mill, an ammeter should be included as part of the electrical system. This will allow the operator to adjust the feed rate to secure the maximum capacity of the mill without overloading the motor. In the production of wood pellets, the mixture is fed through a pellet mill using either a flat die or a ring die compression system.

During the pelleting process, friction can occur due to the difference in temperature of the feed entering the pellet mill die and the pellets being discharged from the die. The difference reflects the mechanical energy required to produce a pellet. There are several inherent factors that can affect friction including moisture in the mixture, conditioning, particle size of the mixture ingredients, physical properties of the mixture ingredients, including mineral content, solubility, and fiber content. Additionally, friction can result according to the die size in terms of mesh diameter and thickness. Further, pelleting of woody material creates friction in the die itself, which in turn can create significant heat during the pelleting process and which becomes a limiting factor in the rate at which pellets can be produced. In certain cases, organic and/or petroleum-based materials (lubricants) are added in small quantities to the woody feedstock in order to facilitate the pelleting process, thereby reduce the friction-based heat, and increasing the overall rate of pellet production.

The addition of dried spent coffee grounds (SCG) has been found to be a suitable lubricant for reducing friction in the pelletizing process. SCG contain a significant amount of natural organic oils which contain both high BTU content as well as significant lubricating properties. When SCG are premixed with woody biomass prior to pelleting in amounts from about 0.5% by weight to about 10% by weight, significant lubrication of the pelleting process occurs. Binders may or may not be included with the woody biomass. Because of the reduced friction imparted by the SCG, lower heat production during the process may be realized. In addition, pellet production rates have been found to increase by up to 30% over conventional pelleting processes, using conventional lubricants. Dried coffee grounds are particularly useful as a lubricant in the pellet production process for both flat die and ring die production.

As shown in FIG. 2, coffee arrives at a receiving station 50 of a drying facility from a coffee facility and enters a fluidized bed dryer 60 at 30% to 60% moisture. However, the starting moisture may vary beyond this range depending on the manufacture of the coffee grounds. The drying facility includes a receiving dock, burners, dust collectors, a bagging station, and silos for storing the dried coffee grounds. Dust collection 70 allows excess material to be properly ventilated while the dryer is operating. The coffee grounds are dried to a moisture content of 15% of less. Following drying, the dried coffee grounds are stored in silos in preparation for bagging, as shown at 80. The material is then transferred to sacks 90 and loaded for transportation 100 to a pelletizing facility. The dried coffee grounds are then placed in a mixer along with wood for pelletizing 110. The mixture then enters the pellet mill 120, which operates more efficiently due to the lubricating properties of the coffee grounds.

One example of dried coffee grounds suitable for the process is:

| Lab No: 96949 Sample ID: Dried Coffee | | | | | | | Metric: Solids Sampled: |
|---|---|---|---|---|---|---|---|
| Test | Results | Units | MQL | DF | Date/Time Analyzed | By | Analytical Method |
| Moisture | 5.00 | % | 0.10 | 1 | Jun. 7, 2018 14:15 | | AOAC 930.15 |
| Dry Matter | 95.8 | % | 0.10 | 1 | Jun. 7, 2018 14:15 | CLF | AOAC 930.15 |
| Crude Protein | 10.9 | % | 0.1 | 1 | Jun. 7, 2018 17:15 | CLF | AOAC 990.03 |
| Crude Fat | 26.4 | % | | 1 | Jun. 7, 2018 11:52 | RLF | AOAC 920.29 |
| Lab No: 96950 Sample ID: Dried Coffee A | | | | | | | Metric: Solids Sampled: |
| Test | Results | Units | MQL | DF | Date/Time Analyzed | By | Analytical Method |
| Moisture | 5.00 | % | 0.10 | 1 | Jun. 7, 2018 14:15 | | AOAC 930.15 |
| Dry Matter | 95.0 | % | 0.10 | 1 | Jun. 7, 2018 14:15 | CLF | AOAC 930.15 |
| Crude Protein | 10.8 | % | 0.1 | 1 | Jun. 7, 2018 17:19 | CLF | AOAC 990.03 |
| Acid Detergent Fiber | 75.4 | % | 0.100 | 1 | Jun. 7, 2018 12:01 | RLF | AOAC 973.18 |
| Neutral Detergent Fiber | 77.1 | % | 0.100 | 1 | Jun. 7, 2018 12:13 | RLF | NDF |
| Total Digestible Nutrients (TDN) | 41.2 | % | 0.100 | 1 | Jun. 7, 2018 12:01 | RLF | AOAC 973.18 |
| Estimated Net Energy (ENE) | 22.0 | Mcal/lb | | 1 | Jun. 7, 2018 12:01 | RLF | AOAC 973.18 |
| Net Energy Lactation (NEL) | 0.406 | Mcal/lb | | 1 | Jun. 7, 2018 12:01 | RLF | AOAC 973.18 |
| Net Energy Maintenance (NEM) | 0.314 | Mcal/lb | | 1 | Jun. 7, 2018 12:01 | | AOAC 973.18 |
| Net Energy Gain (NEG) | 0.094 | Mcal/lb | | 1 | Jun. 7, 2018 12:01 | | AOAC 973.18 |
| Calcium | 0.07 | % | | 1 | Jun. 7, 2018 11:26 | CLF | FEED METALS |
| Phosphorus | 0.01 | % | | 1 | Jun. 7, 2018 11:26 | CLF | FEED METALS |

| | | | | | | |
|---|---|---|---|---|---|---|
| Potassium | 0.05 | % | 1 | Jun. 7, 2018 11:26 CLF | FEED METALS |
| Magnesium | 0.01 | % | 1 | Jun. 7, 2018 11:26 CLF | FEED METALS |

| | | | | | |
|---|---|---|---|---|---|
| Qualifiers/ Definitions | DF | Dilution Factor | MQL | Method Quantitation Limit | |

In this embodiment, the amount of dried coffee grounds used in the wood may be 1%, 2.5% or 5% and the moisture content is between 5-15% but may be as low as 3%. As noted above, the amount of coffee grounds can be up to about 10% and the moisture content may be up to about 15%. Since the coffee grounds are substantially rich in oils, dried coffee grounds have been found to improve the efficiency of pelleting machinery at relatively low amounts in the mix. Thus, the machine is less likely to buckle, or knock during the pelleting process when coffee grounds are added to the wood material.

Not only do the coffee grounds affect the final product by helping the material flow through the pellet machinery in a quicker fashion, the small amounts of coffee result in some increase in the BTU levels of the finished product because dried coffee grounds have a BTU content per unit of mass approximately 30% higher than the wood feedstock.

In the following Embodiments and Examples wood material was used to form pellets. Further areas of applicability will become apparent from the description provided herein. The description and specific examples are intended for purposes of description only and are not intended to limit the scope of the present disclosure. Although it should be understood by one skilled in the art that other wood or biomass materials may be used, the Examples use hardwood (oak) or softwood (pine). The equipment used in the Examples includes a CME HMA 200 Hammer Mill and an R150 200 HP Pellet Mill. The die used for the hardwood examples was an 8:1 die and the die in the hardwood example was a 10:1 die, each producing 0.25 inch diameter pellets. The moisture content of the hardwood samples was about 11%, which was raised to 12% by the addition of 1% moisture. The softwood pine moisture content was about 14.95%. The moisture content of the resulting pellets was under 10%.

The lubricants tested in the Examples include vegetable oil, i.e. flaxseed oil, for the comparative examples and spent coffee grounds for the illustrative examples. The spent coffee grounds used in the Examples, which were previously dried, had a moisture percentage of about 14.5%.

The ambient temp at time of testing was 51-54 degrees F. and the bulk density for the hardwood was measured to be 21 lbs. per cubic foot after hammer milling with ¼" screen. Abrasiveness of the wood material was high, and the resulting pellets were very hard. Each example also included the use of a ribbon blender with a batch mix time of approximately 2 minutes.

In general, the following examples confirm that spent coffee grounds increase the production rate, while decreasing amperage and decreasing die/pellet temperatures. The of increased production rates was substantial at the same amperage rates. Example 1, with 100% hardwood, produced pellets at a rate of 1110 lbs. per hour, while Example 6, with 10% spent coffee grounds, produced pellets at a rate of 2550 lbs. per hour. Thus, the rate using spent coffee grounds was over 100% faster at the same amperage.

The equipment used for the test was cleaned out between the hardwood and softwood runs with a control batch of the appropriate material before testing began. Each test batch for the hardwood was approximately 500 lbs. and the softwood test batches were approximately 200 lbs. (see below). These batch weights were determined based on the amount of time it took to get the mill up to temperature, balance out the amps and then collect the speed samples. The amp readings were collected after the amps leveled off for approximately 1 minute. We used a digital amp meter measuring one leg of the three phase main drive motor on the pellet mill. The production speed times were collected by harvesting all of the pellets after the pellet mill for 60 seconds and multiplying that number by 60 minutes for a production rate of lbs. per hour. Control batches of the hardwood and softwood were run to determine typical operating amps, temperatures and production speeds. (see below). Pellet temperature was collected right after the pellet mill door on the output conveyor. All materials were processed through a ¼" screen on a tear drop hammer mill.

Hardwood Comparative Example 1

A first comparative example was conducted using a CME R150 Pellet Mill and 100% hardwood (Oak). The die was an 8:1 L/D ¼" die (2" thick) and 500 lbs. hardwood (100%) was used. About 5 lbs. of water was added to increase moisture content to 12% and bringing the total weight to 505 lbs. The pellet temperature was about 250 degrees F. and the motor amperage was between 222-255. The production rate was 1380 lbs. per hour with fines and 1110 lbs. per hour without fines. The amount of fines was about 19.6%. The pellet bulk density was 42 lbs. per cubic foot. The resulting pellets were dark and looked slightly burned. Further, the pellet durability was good, and the pellets were 1" long.

Hardwood Comparative Example 2

A second comparative example included the testing of 99% hardwood (Oak) with 1% vegetable oil as a lubricant. The die was an 8:1 L/D ¼" die (2" thick) and 490 lbs. hardwood (99%) was used. About 5 lbs. of water was added to increase the moisture content to 12% and 5 lbs. of vegetable oil (1%) was added, bringing the total weight to 500 lbs. (495 lbs. of material). The pellet temperature was about 181 degrees F. and the motor amperage was about 229-250. The production rate was 2640 lbs. per hour with fines and 1545 lbs. per hour without fines. The amount of fines was 41.5%. The pellet bulk density was 39.75 lbs. per cubic foot. The resulting pellets were hard and about ¼"-⅜" in length. There an increase in the amount of fines due to the vegetable oil. In general, using less than 1% vegetable oil would have decreased the fines but also slowed down the production speed.

Hardwood Example 1

A test example included the testing of 99% hardwood (Oak) and 1% spent coffee grounds as a lubricant. The die was an 8:1 L/D ¼" die (2" thick) and 490 lbs. of Hardwood (99%) was used. About 5 lbs. of water was added to increase moisture to 12% and 5 lbs. of spent coffee grounds (1%) was added, bringing the total weight to 500 lbs. (495 lbs. of material). The pellet temperature was 201 degrees F. and the motor amperage was about 226-249. The production rate was 2055 lbs. per hour with fines and 1470 lbs. per hour without fines. The amount of fines was about 28.5%. The pellet bulk density was 43.5 lbs. per cubic foot. The resulting pellets were hard and about ¼"-⅜" in length.

Hardwood Example 2

An additional test example included the testing of 97.5% hardwood (Oak) 97.5% and 2.5% spent coffee grounds. The die was an 8:1 L/D ¼" die (2" thick) and 482.5 lbs. hardwood (97.5%) was used. About 5 lbs. of water was added to increase moisture to 12% and 12.5 lbs. spent coffee grounds (2.5%) was added, bringing the total weight to 500 lbs. (495 lbs. of material). The pellet temperature was 205 degrees F. and the motor amperage was about 225-245. The production rate was 2310 lbs. per hour with fines and 1575 lbs. per hour without fines. The amount of fines was 31.9% and the pellet bulk density was 44.25 lbs. per cubic foot. The resulting pellets were hard and about ¼"-⅜" in length.

Hardwood Example 3

A third test example included the testing of 95% hardwood (Oak) and 5% spent coffee grounds. The die was an 8:1 L/D ¼" die (2" thick) and 470 lbs. hardwood (95%) was used. About 5 lbs. of water was added to increase moisture to 12% and 25 lbs. spent coffee grounds (5%) was added, bringing the total weight to 500 lbs. (495 lbs. of material). The pellet temperature was 182 degrees F. and the motor amperage was about 237-259. The production rate was 2655 lbs. per hour with fines and 2010 lbs. per hour without fines. The amount of fines was 24.3% and the pellet bulk density was 44.25 lbs. per cubic foot. The resulting pellets were hard and about ¼"-⅜" in length.

Hardwood Example 4

A fourth test example included the testing of 90% hardwood (Oak) and 10% spent coffee grounds. The die was an 8:1 L/D ¼" die (2" thick) and 450 lbs. Hardwood (90%) was used. About 5 lbs. of water was added to increase moisture to 12% and 50 lbs. spent coffee grounds (10%) was added, bringing the total weight to 505 lbs. (500 lbs. of material). The pellet temperature was 168 degrees F. and the motor amperage was about 232-248. The production rate was 3060 lbs. per hour with fines and 2550 lbs. per hour without fines. The amount of fines was 16.7% and the pellet bulk density was 42 lbs. per cubic foot. The resulting pellets were hard and about ¼"-⅜" in length.

Softwood Comparative Example 1

A first comparative example was conducted using a CME R150 Pellet Mill and 100% softwood (pine). The die was a 10:1 L/D ¼" die (1.5" thick) and 200 lbs. softwood (100%) was used. No additional water was added, and the total weight was 200 lbs. The pellet temperature was about 221 degrees F. and the motor amperage was between 168-193. The production rate was 1200 lbs. per hour with fines and 1060 lbs. per hour without fines. The amount of fines was about 11.25%. The pellet bulk density was 44.25 lbs. per cubic foot. The resulting pellets were ¼"-⅜" long and hard.

The fines percentage was lower than the hardwood due to a higher moisture percentage in the wood material.

Softwood Comparative Example 2

A first comparative example was conducted using 99% softwood (pine) and 1% vegetable oil as a lubricant. The die was a 10:1 L/D ¼" die (1.5" thick) and 298 lbs. softwood (100%) and 2 lbs. of vegetable oil (1%) was used. No additional water was added, and moisture content was 15%. The pellet temperature was about 185 degrees F. and the motor amperage was between 167-193. The production rate was 1350 lbs. per hour with fines and 1095 lbs. per hour without fines. The amount of fines was about 18.8%. The pellet bulk density was 44.25 lbs. per cubic foot. The resulting pellets were ¼"-⅜" long and hard.

Softwood Example 1

A first test example was conducted using 99% softwood (pine) and 1% spent coffee grounds as a lubricant. The die was a 10:1 L/D ¼" die (1.5" thick) and 198 lbs. softwood (99%) and 2 lbs. of spent coffee grounds (1%) was used. No additional water was added, and moisture content was 15%. The pellet temperature was about 208 degrees F. and the motor amperage was between 164-192. The production rate was 1500 lbs. per hour with fines and 1170 lbs. per hour without fines. The amount of fines was about 22%. The pellet bulk density was 44.25 lbs. per cubic foot. The resulting pellets were ¼"-⅜" long and hard.

Softwood Example 2

A second test example was conducted using 97.5% softwood (pine) and 2.5% spent coffee grounds as a lubricant. The die was a 10:1 L/D ¼" die (1.5" thick) and 195 lbs. softwood (97.5%) and 5 lbs. of spent coffee grounds (2.5%) was used. No additional water was added, and moisture content was 15%. The pellet temperature was about 212 degrees F. and the motor amperage was between 168-193. The production rate was 1455 lbs. per hour with fines and 1125 lbs. per hour without fines. The amount of fines was about 22.7%. The pellet bulk density was 43.5 lbs. per cubic foot. The resulting pellets were ¼"-⅜" long and hard. This test is a bit of an anomaly as the production rate and temperature went the opposite direction as expected. This may be due to the temperature of the mill or an unknown variance.

Softwood Example 2.1

Due to the unexpected results of Softwood Example 2, a second test was conducted using 97.5% softwood (pine) and 2.5% spent coffee grounds as a lubricant. The die was a 10:1 L/D ¼" die (1.5" thick) and 195 lbs. softwood (97.5%) and 5 lbs. of spent coffee grounds (2.5%) was used. No additional water was added, and moisture content was 15%. The pellet temperature was about 151 degrees F. and the motor amperage was between 148-165. The production rate was 2130 lbs. per hour with fines and 2070 lbs. per hour without fines. The amount of fines was about 2.82%. The pellet bulk density was 43.5 lbs. per cubic foot. The resulting pellets were ¼"-⅜" long and hard. The percentage of fines and pellet temperature were lower than expected in this Example, but this is likely due to variance in the overall moisture content of the softwood material. The results of Softwood Example 2.1 further suggest that the results of Softwood Example 2 were an anomaly.

Softwood Example 3

A third test example was conducted using 95% softwood (pine) and 5% spent coffee grounds as a lubricant. The die was a 10:1 L/D ¼" Die (1.5" thick) and 190 lbs. softwood (95%) and 10 lbs. of spent coffee grounds (5%) was used. No additional water was added, and moisture content was 15%. The pellet temperature was about 200 degrees F. and the motor amperage was between 167-191. The production rate was 2370 lbs. per hour with fines and 2220 lbs. per hour without fines. The amount of fines was about 6.4%. The pellet bulk density was 43.5 lbs. per cubic foot. The resulting pellets were ¼"-⅜" long and hard. The fines were reduced, and the speed was increased in this example.

Softwood Example 4

A fourth test example was conducted using 90% softwood (pine) and 10% spent coffee grounds as a lubricant. The die was a 10:1 L/D ¼" Die (1.5" thick) and 180 lbs. softwood (90%) and 20 lbs. of spent coffee grounds (10%) was used. No additional water was added, and moisture content was 15%. The pellet temperature was about 139 degrees F. and the motor amperage was between 151-168. The production rate was 2580 lbs. per hour with fines and 2460 lbs. per hour without fines. The amount of fines was about 4.65%. The pellet bulk density was 43.5 lbs. per cubic foot. The resulting pellets were ¼"-⅜" long and hard.

Softwood Example 5

A fifth test example was conducted using 77% softwood (pine) and 23% spent coffee grounds as a lubricant. The die was a 10:1 L/D ¼" Die (1.5" thick) and about 34.5 lbs. softwood (77%) and about 34.5 lbs. of spent coffee grounds (23%) was used. No additional water was added, and moisture content was 15%. The pellet temperature was about 137 degrees F. and the motor amperage was between 147-162. The production rate was 3330 lbs. per hour with fines and 1740 lbs. per hour without fines. The amount of fines was about 47.75%. The pellet bulk density was 43.5 lbs. per cubic foot. The resulting pellets were very soft and short and fell through the screen following pelleting. Thus, an amount of 23% spent coffee grounds is too high to effectively form pellets using the disclosed process.

Thus, the Examples show that spent coffee grounds, at least up to 10%, have a substantial lubricating effect on hard and softwood pelleting. Changes and modifications of the preferred embodiments described above will become apparent to persons skilled in the art. The scope of the invention is therefore intended to be limited solely by the scope of the appended claims.

We claim:

1. A process for producing pellets using coffee grounds as a lubricant, comprising:
   providing coffee grounds having an initial moisture content;
   drying the coffee grounds to a second moisture content of 1-15%, by weight, to produce dried coffee grounds;
   forming a mixture of about 0.5-10%, by weight, dried coffee grounds and about 90-99.5%, by weight, wood material, said mixture having a third moisture content;
   compressing the mixture in a pellet mill to form pellets including wood material and about 0.5-10%, by weight, coffee grounds, wherein the coffee grounds act as a lubricant in the process for producing pellets and the mixture is devoid of additional oils, and
   wherein the pellet production rate was 2055 lbs. per hour with fines for hardwood wood material or 1500 lbs. per hour with fines for softwood wood material.

2. The process of claim 1, wherein the pellets are extruded through a die to form pellets having a diameter of 0.25 inches.

3. The process of claim 1, wherein the amount of coffee grounds is 1-10%, by weight.

4. The process of claim 1, wherein the amount of coffee grounds is 5-10%, by weight.

5. The process of claim 1, wherein fines are routed back to the mixture for reprocessing.

6. The process of claim 1, wherein the mixture further includes binders.

7. Pellets produced by a process for producing pellets using coffee grounds as a lubricant, said pellets comprising:
   about 0.5-10%, by weight, coffee grounds having a first moisture content;
   about 90-99.5%, by weight, of a wood material;
   wherein said coffee grounds and wood are formed into a mixture having a second moisture content and compressed in a pellet mill to form pellets including about 0.5-10%, by weight, coffee grounds, wherein the coffee grounds act as a lubricant in the process for producing pellets and the mixture is devoid of additional oils, and
   wherein the pellet were produced at a rate of 2055 lbs. per hour with fines for hardwood wood material or 1500 lbs. per hour with fines for softwood wood material.

8. The pellets of claim 7, wherein the first moisture content is 15% or less, by weight.

9. The pellets of claim 7, wherein the amount of coffee grounds is 1-10%, by weight.

10. The pellets of claim 7, wherein the amount of coffee grounds is 5-10%, by weight.

11. The pellets of claim 7, wherein additional moisture is added to the mixture and the second moisture content is about 8 to 14%, by weight.

12. The pellets of claim 7, wherein the pellets are extruded through a die to form pellets having a diameter of 0.25 inches.

13. The pellets of claim 7, wherein the mixture further includes binders.

* * * * *